(12) United States Patent
Pani et al.

(10) Patent No.: US 9,131,488 B2
(45) Date of Patent: *Sep. 8, 2015

(54) CHANNEL SELECTION FOR UPLINK ACCESS

(71) Applicant: InterDigital Patent Holdings, Inc., Wilmington, DE (US)

(72) Inventors: Diana Pani, Montreal (CA); Paul Marinier, Brossard (CA); Christopher Cave, Dollard-des-Ormeaux (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/301,759

(22) Filed: Jun. 11, 2014

(65) Prior Publication Data

US 2014/0295862 A1    Oct. 2, 2014

Related U.S. Application Data

(63) Continuation of application No. 13/570,647, filed on Aug. 9, 2012, now Pat. No. 8,792,447.

(60) Provisional application No. 61/522,504, filed on Aug. 11, 2011, provisional application No. 61/555,201, filed on Nov. 3, 2011, provisional application No. 61/589,760, filed on Jan. 23, 2012.

(51) Int. Cl.
  *H04W 4/00* (2009.01)
  *H04W 72/04* (2009.01)

(52) U.S. Cl.
  CPC ...... *H04W 72/0413* (2013.01); *H04W 72/0406* (2013.01)

(58) Field of Classification Search
  USPC ............... 370/329, 341, 432; 455/450–454
  See application file for complete search history.

(56) References Cited

U.S. PATENT DOCUMENTS 8,149,773 B2   4/2012   Sambhwani et al.
8,437,302 B2   5/2013   Martin et al.
(Continued)

FOREIGN PATENT DOCUMENTS

JP    2011/509606 A    3/2011

OTHER PUBLICATIONS

3rd Generation Partnership Project (3GPP), R2-113011, "Discussion on Fallback to R99 PRACH", Huawei, HiSilicon, 3GPP TSG RAN WG2 #74, Barcelona, Spain, May 9-13, 2011, 2 pages.

(Continued)

*Primary Examiner* — Dady Chery
(74) *Attorney, Agent, or Firm* — Condo Roccia Koptiw LLP

(57) ABSTRACT

Systems, methods, and instrumentalities are disclosed for a wireless transmit/receive unit (WTRU) to transmit uplink information. The WTRU may have information such as data or control information to transmit to a network. The (WTRU) may request a common enhanced dedicated channel (E-DCH) resource from the network. The WTRU may receive an indication from the network to fallback using a random access channel, e.g. a Release 99 Random Access Channel (R99 RACH), a Release 99 Physical Random Access Channel (R99 PRACH), etc. The indication may be received via an acquisition indicator (E-AI). The indication may be a value of the E-AI. The WTRU may determine whether a condition is met. The WTRU may transmit the uplink information over the R99 PRACH if the condition is met.

16 Claims, 6 Drawing Sheets

(56) References Cited

U.S. PATENT DOCUMENTS

| | | |
|---|---|---|
| 2008/0101305 A1 | 5/2008 | Cave et al. |
| 2009/0168750 A1 | 7/2009 | Pelletier et al. |
| 2010/0203915 A1 | 8/2010 | Baker et al. |
| 2010/0309856 A1 | 12/2010 | Baker et al. |
| 2012/0213058 A1 | 8/2012 | Duan et al. |

OTHER PUBLICATIONS $3^{rd}$ Generation Partnership Project (3GPP), R2-113169, "Fallback to R99 RACH", Nokia Siemens Networks, 3GPP TSG-RAN WG2 Meeting #74, Barcelona, Spain, May 9-13, 2011, 3 pages.

$3^{rd}$ Generation Partnership Project (3GPP), R2-113325, "Fallback for to R99 RACH", Ericsson, ST-Ericsson, 3GPP TSG- RAN WG2 #74, Barcelona, Spain, May 9-13, 2011, 2 pages.

$3^{rd}$ Generation Partnership Project (3GPP), R2-114157, "Fallback to R99 RACH", Ericsson, ST-Ericsson, 3GPP TSG- RAN WG2 #75, Athens, Greece, Aug. 22-26, 2011, 3 pages.

$3^{rd}$ Generation Partnership Project (3GPP), RP-110436, "Further Enhancements to CELL_FACH" Ericsson, ST-Ericsson, Qualcomm Incorporated, 3GPP TSG-RAN Meeting #51, Kanas City, Kanas, USA, Mar. 15-18, 2011, 5 pages.

$3^{rd}$ Generation Partnership Project(3GPP), R1-080906, "Timing and acknowledgement signaling for EUL in CELL_FACH", Ericsson, 3GPP TSG RAN WG1 Meeting #52, Sorrento, Italy, Feb. 11-15, 2008, 2 pages.

$3^{rd}$ Generation Partnership Project (3GPP), R2-112323, "Overview of CELL_FACH enhancements", Ericsson, ST-Ericsson, 3GPP TSG-RAN WG2 #72bis, Shanghai, P.R. of China, Apr. 11-15, 2011 5 pages.

$3^{rd}$ Generation Partnership Project (3GPP), R1-080794, "Discussion on Multi-kind Random Access and Resource Allocation Scheme for Enhanced CELL_FACH State", Huawei, 3GPP TSG RAN WG1 Meeting #52, Sorrento, Italy, Feb. 11-15, 2008, 4 pages.

$3^{rd}$ Generation Partnership Project (3GPP), R2-112059, "Discussion on Fallback to R99 PRACH", Huawei, HiSilicon, 3GPP TSG_RAN WG2 #73b, Shanghai, China Apr. 11-15, 2011, 2 pages.

CHANNEL SELECTION FOR UPLINK ACCESS

CROSS-REFERENCE TO RELATED APPLICATIONS

This application is a continuation of U.S. patent application Ser. No. 13/570,647, filed Aug. 9, 2012 which claims the benefit of U.S. Provisional Patent Application No. 61/522,504, filed Aug. 11, 2011, U.S. Provisional Patent Application No. 61/555,201, filed Nov. 3, 2011, and U.S. Provisional Patent Application No. 61/589,760, filed Jan. 23, 2012, the contents of which are hereby incorporated by reference herein.

BACKGROUND

Mobile networks have experienced continuous increases in data traffic due in part to the introduction of new mobile services and applications. Such traffic may be characterized by its high level of burstiness and/or small packet sizes. In Universal Mobile Telecommunications Systems (UMTS), mobile devices experiencing varying traffic demands may be maintained in non-fully connected states during periods of low activity, such as, but not limited to CELL_FACH or CELL_PCH. The non-fully connected states may help to provide a user experience that is closer to "always-on connectivity," while maintaining low battery consumption.

SUMMARY

Systems, methods, and instrumentalities are disclosed for a wireless transmit/receive unit (WTRU) to transmit uplink information. The WTRU may have information such as data or control information to transmit to a network. The (WTRU) may request a common enhanced dedicated channel (E-DCH) resource from the network. The WTRU may receive an indication from the network to fallback using a random access channel, e.g. a Release 99 Random Access Channel (R99 RACH), a Release 99 Physical Random Access Channel (R99 PRACH), etc. The indication may be received via an acquisition indicator (E-AI). The indication may be a value of the E-AI. The WTRU may determine whether a condition is met. The WTRU may transmit the uplink information over the R99 PRACH if the condition is met.

The condition may be met if one or more of the following is established: the channel for transmission is capable of being mapped to the R99 RACH; the channel for transmission may be configured with a fixed Radio Link Control (RLC) Protocol Data Unit (PDU) size; or the channel for transmission belongs to a list of channels that is predefined in the WTRU, whereby the list may include one or more of a common control channel (CCCH) or a dedicated control channel (DCCH). If the condition is not met, the WTRU may back off from accessing the network, ignore the indication from the network to fallback to the R99 PRACH, wait for a time, and attempt to access the network.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
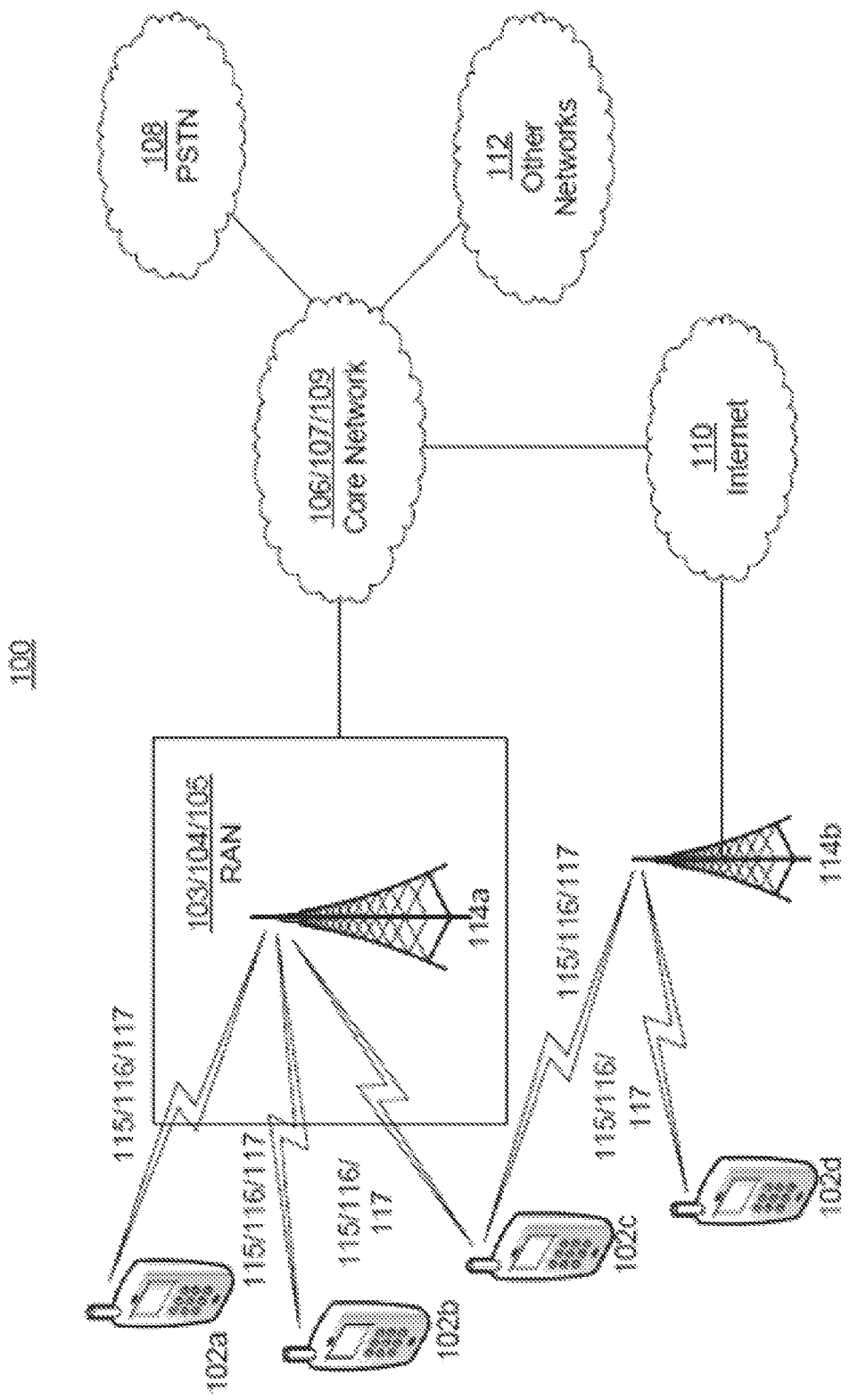
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
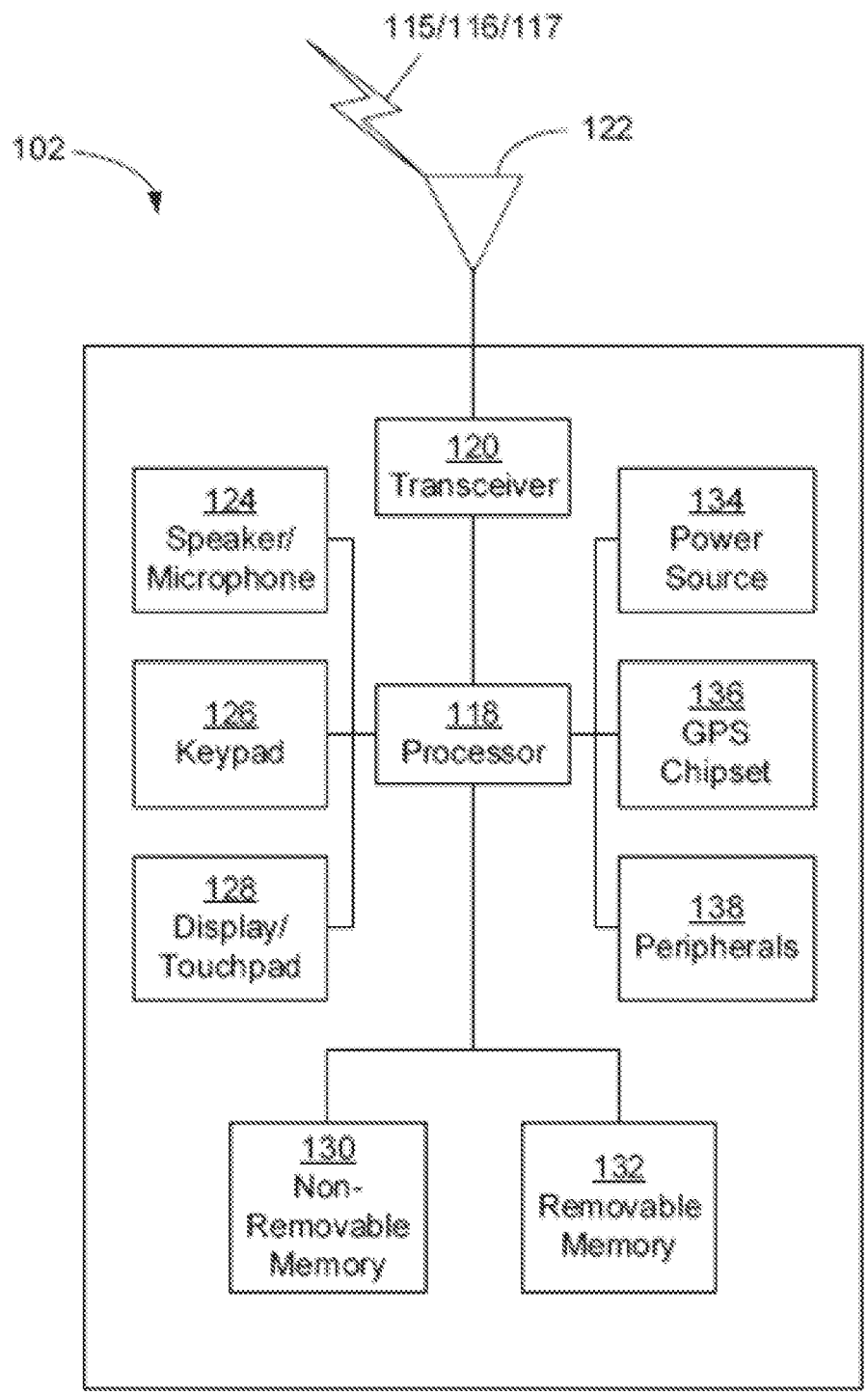
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
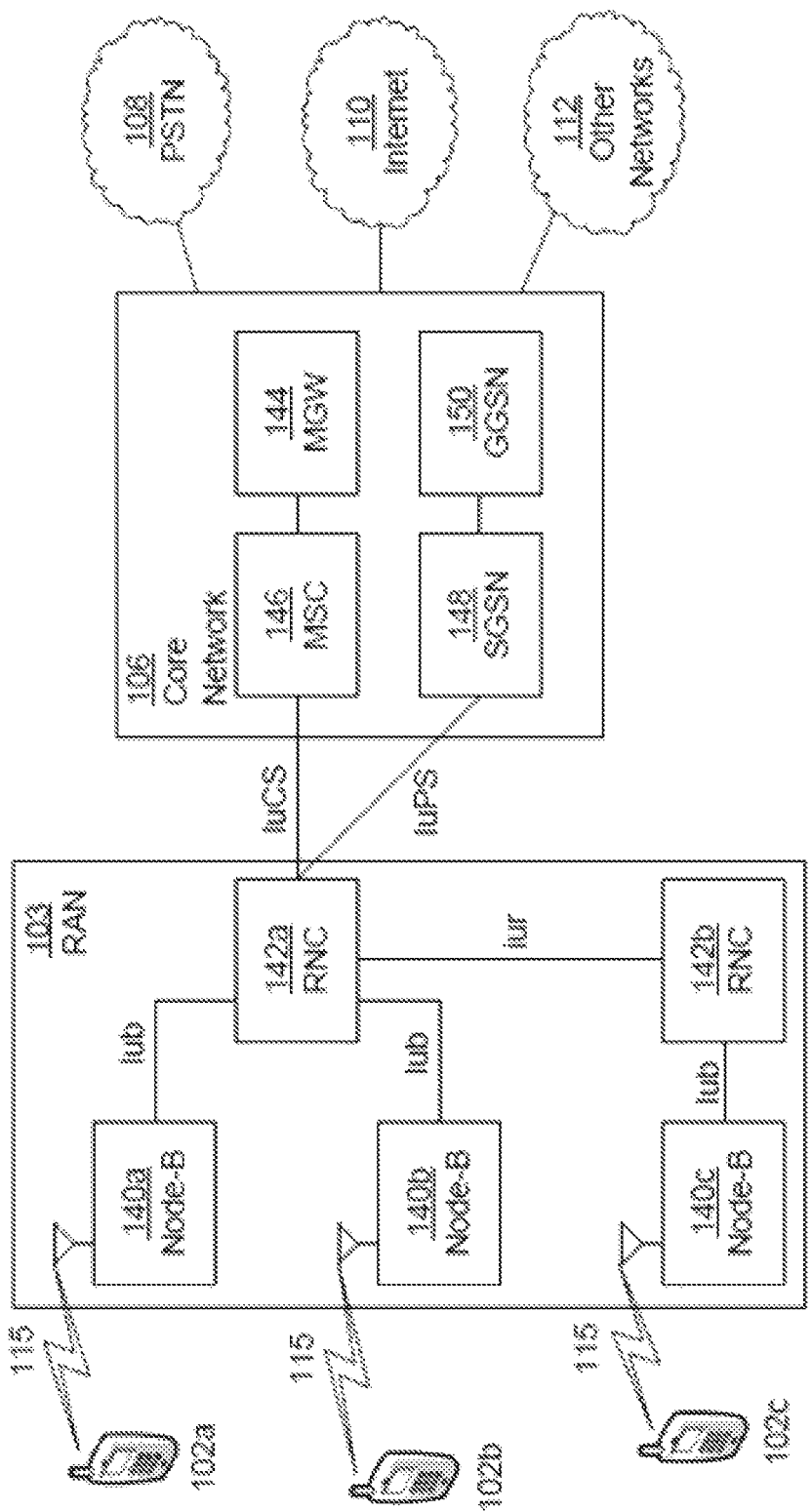
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
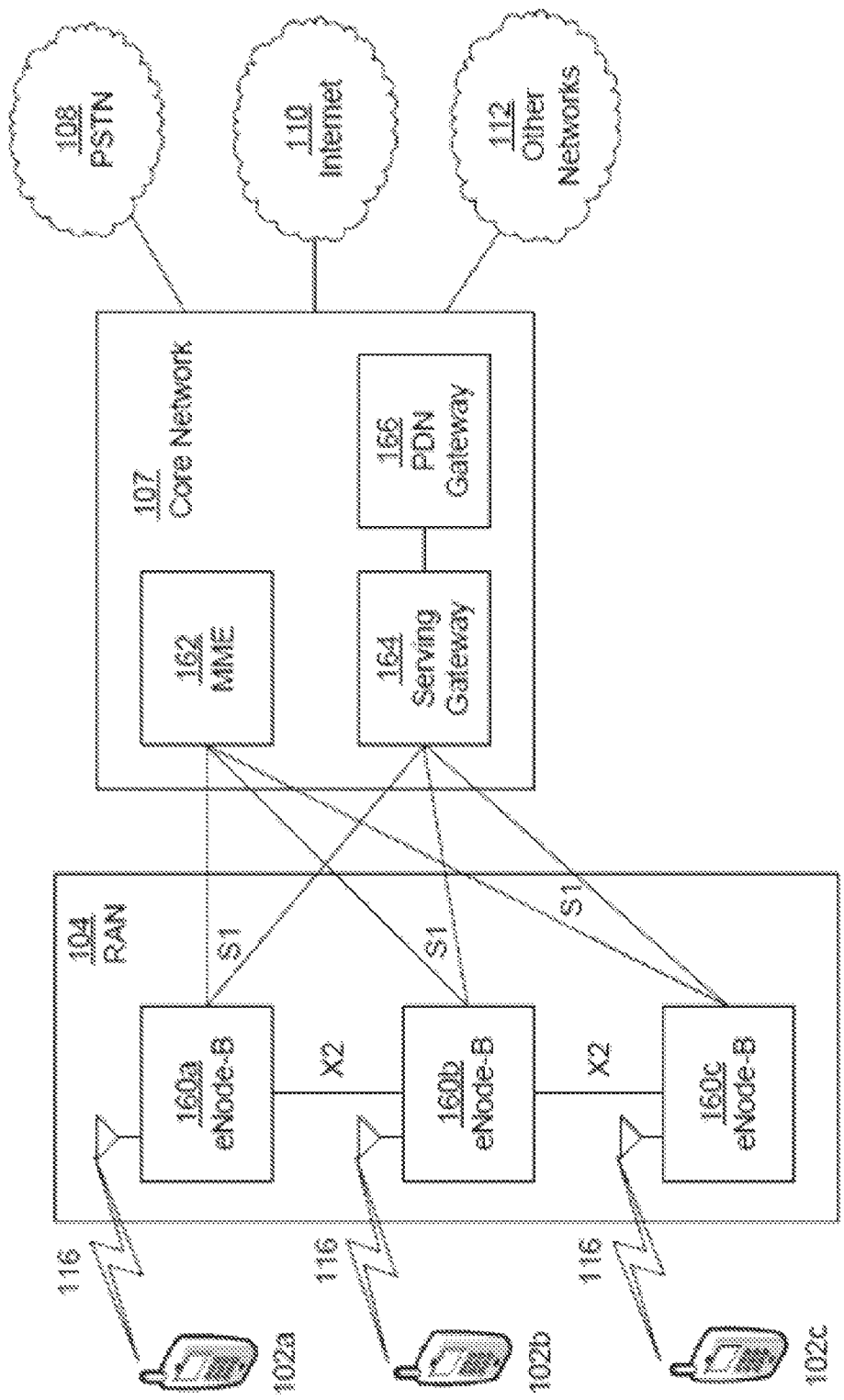
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
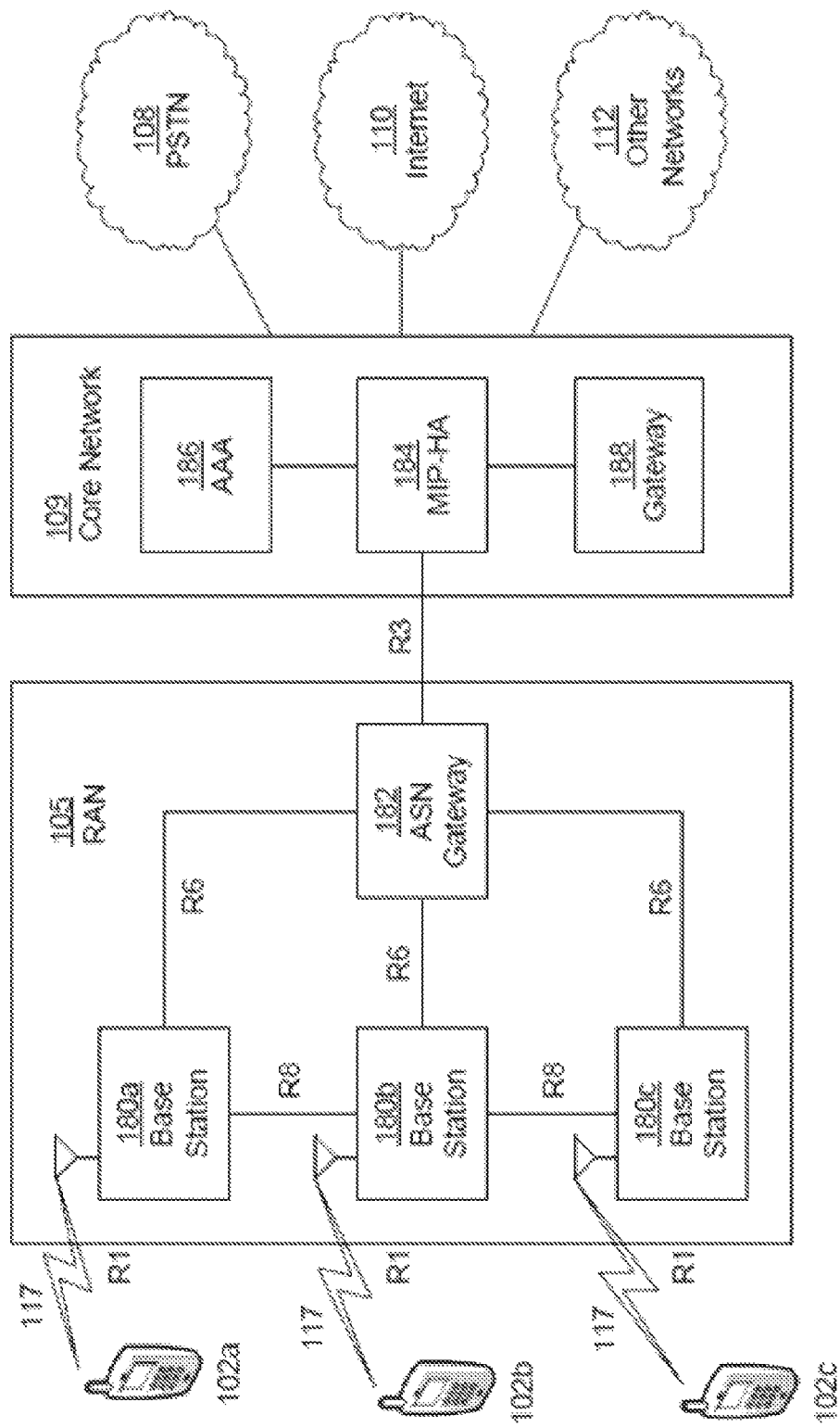
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems, methods, and instrumentalities are disclosed for a wireless transmit/receive unit (WTRU) to transmit uplink information. The WTRU may have information such as data or control information to transmit to a network. The (WTRU) may request a common enhanced dedicated channel (E-DCH) resource from the network. The WTRU may receive an indication from the network to fallback using a random access channel, e.g. a Release 99 Random Access Channel (R99 RACH), a Release 99 Physical Random Access Channel (R99 PRACH), etc. The indication may be received via an acquisition indicator (E-AI). The indication may be a value of the E-AI. The WTRU may determine whether a condition is met. The WTRU may transmit the uplink information over the R99 PRACH if the condition is met.

The condition may be met if one or more of the following is established: the channel for transmission is capable of being mapped to the R99 RACH; the channel for transmission may be configured with a fixed Radio Link Control (RLC) Protocol Data Unit (PDU) size; or the channel for transmission belongs to a list of channels that is predefined in the WTRU, whereby the list may include one or more of a common control channel (CCCH) or a dedicated control channel (DCCH). If the condition is not met, the WTRU may back off from accessing the network, ignore the indication from the network to fallback to the R99 PRACH, wait for a time, and attempt to access the network.

A wireless transmit/receive unit (WTRU) may be in an idle state or a connected state. Based on the WTRU mobility and activity while in the connected state, a universal terrestrial radio access network (UTRAN) may direct the WTRU to transition between a number of sub-states, which may include one or more of the following: CELL_PCH, URA_PCH, CELL_FACH, or CELL_DCH states. User plane communication between the WTRU and the UTRAN may be possible while in CELL_FACH and CELL_DCH states. The CELL_DCH state may be characterized by dedicated channels in uplink and downlink. On the WTRU side, the CELL_DCH state may correspond to continuous transmission and/or reception and may be demanding on user power requirements. The CELL_FACH state may not use dedicated channels and, thus may allow better power consumption at the expense of a lower uplink and downlink throughput.

Uplink communication may be achieved through a random access channel (RACH) mapped to a physical random access channel (PRACH). The RACH may be a contention-based channel. A power ramp-up procedure may be used to acquire a channel and/or to adjust transmit power. An RACH may be a shared channel used for an initial access to obtain dedicated resources and/or to transmit small amount of data. There may be collisions between two or more WTRUs trying to access the channel simultaneously.

The RACH procedure may have a channel acquisition stage, which may use a slotted-ALOHA mechanism, followed by an RACH message transmission stage. For example, a WTRU that wants to access a channel may randomly select a signature and transmit an RACH preamble to a Node B during a randomly selected access slot at a certain transmit power level. If the Node B detects the signature and if an associated resource is free, the Node B may transmit a positive acknowledgement (ACK) on an acquisition indicator channel (AICH). After receiving an acquisition indicator (AI) (e.g., ACK), on the AICH, the WTRU may transmit an RACH message. If the associated resource is unavailable, the Node B may respond with a negative acknowledgement (NACK) on the AICH. This may trigger a back-off mechanism at the WTRU. The WTRU may start a back-off timer (e.g., Tbo1). After expiry of the timer, a preamble ramping cycle count may be incremented and the procedure may start again. This may restart the RACH procedure at a later random time. If the RACH preamble from the WTRU is not detected at the Node B, an AI may not be transmitted on the AICH. If the WTRU fails to receive an AI after transmission of the RACH preamble, the WTRU may try again in a subsequent access slot with a randomly chosen signature and/or a higher transmit power. This may continue up to a maximum number of times.

The signature may be chosen randomly from a list of available signatures and/or the RACH access procedure may be anonymous. The Node B may not know which WTRU is accessing the channel until the Node B decodes the RACH message. When two or more WTRUs happen to choose the same signature in the same access slot and one of them is detected by the Node B, the Node B may transmit an ACK. The WTRUs may interpret this as a having acquired the channel and may access the channel simultaneously to transmit RACH messages. This may cause a collision on the RACH messages. When a collision occurs, the RACH messages may not be decoded correctly. Collisions may be difficult to detect and/or incur additional delays.

The RACH procedure may be divided between the medium access control (MAC) layer and the physical layer. The physical layer may control, for example, the preamble transmission, signature selection, access slot selection, and/or preamble transmit power. The MAC layer may control, for example, the interpretation of the AICH response (for example, ACK, NACK, and/or no response), and/or the start of the physical layer procedure. Transmission failure and successful completion of the MAC procedure may be indicated individually for each logical channel, for example, using primitives (such as but not limited to, CMAC-STATUS-Ind for the radio resource control (RRC) and/or MAC-STATUS-Ind for the radio link control (RLC)).

The uplink transmission mechanism in CELL_FACH state may be modified by combining the RACH channel acquisition stage with an enhanced dedicated channel (E-DCH). The procedure may be referred to as enhanced uplink for CELL_FACH and IDLE mode. The Node B may select an E-DCH resource from a set of common E-DCH resources that may be shared amongst the WTRUs. The Node B may respond to a WTRU channel access request by assigning one of these resources. The WTRU may then start transmission over the assigned E-DCH transport channel.

One channel selection scheme may be that common E-DCH capable WTRUs may use common E-DCH when operating in a cell that supports common E-DCH. Otherwise, the WTRU may use the Release 99 RACH. In another channel selection scheme, the use of both R99 RACH and common E-DCH may be used by WTRUs in cells that support both channels. Common E-DCH capable WTRUs may "fallback" to R99 RACH for UL transmission if, for example, common E-DCH resources are congested and/or simply because the nature of the UL transmission is better suited to the R99 RACH channel.

Criteria that may be used for selection of the UL channel may be disclosed. This may include, but is not limited to, whether the WTRU or the RAN should make the channel selection. The selection criteria may be coordinated between WTRU and RAN, e.g., to ensure that, for example, there is no confusion between nodes while ensuring backwards compatibility for WTRUs that are not capable of fallback to R99 RACH.

A fallback to R99 RACH may result in transmission of data over a R99 PRACH from a logical channel configured with flexible a RLC PDU configuration. For example, the R99 RACH may not support MAC segmentation and/or may transmit a limited set of Transport Block Sizes (TBSs). As a result, RLC PDUs created for transmission over common E-DCH may not be compatible for transmission over R99 RACH.

Implementations described herein may relate to selection between common E-DCH and R99 RACH channels for UL transmission in Idle mode, URA_PCH, CELL_PCH and/or CELL_FACH states. As referred to herein, "fallback to R99 RACH" may refer to the use of the R99 RACH channel for transmission of UL control information and/or data by a WTRU that may be capable of transmitting over common E-DCH while operating in a cell that may be capable of reception over both R99 RACH and common E-DCH. As referred to herein, the term "non-DCH states" may be used to describe a state where the WTRU may not be fully connected to the RAN (for example, does not have a set of dedicated resources for DL reception and UL transmission). For example, with specific reference to UMTS networks, the term "non-DCH states" may refer to one or more of the following states: IDLE Mode, URA_PCH State, CELL_PCH State, or CELL_FACH State. Other types of access networks may utilize similar non-DCH states to which the implementations described herein may be applicable.

A WTRU may determine when to perform R99 RACH access. Example triggers are described herein which may be used individually or in any combination. For example, the triggers may be used in conjunction with the triggering conditions and/or selection criteria described in PCT/US08/80971, entitled SELECTING TRANSMISSION PARAMETERS FOR CONTENTION-BASED ACCESS IN WIRELESS SYSTEMS, filed Oct. 23, 2008, which is incorporated herein by reference.

A common E-DCH access failure may refer to one or more of the following: A NACK on the extended acquisition indicators (E-AI), a number of consecutive NACKs, a number of NACKs over a period of time; a NACK on the acquisition indicator channel (AICH) if no E-AI is configured; a collision resolution failure; no response on the AI (e.g., within a certain time duration); or a maximum number of preamble attempts is reached.

A WTRU may use one or more of buffer content, network signaling or congestion level to determine whether to fallback to R99 RACH. For example, if a common E-DCH access fails, if the network redirects to the WRTU to use R99 RACH, and/or if the WRTU is capable of R99 RACH fallback, then the WTRU may determine whether it can use R99 RACH, e.g., if one or more of conditions are met. A condition may be that a buffer size is below a threshold (which may be configurable or predefined). For example, WTRUs with larger buffer size may re-try a common E-DCH access procedures rather than fallback to R99 RACH. After a predefined number of re-tries, the WTRU may determine that it may be appropriate to fallback to R99 RACH. A condition may be that the total UL data that needs to be transmitted may fit into a R99 RACH TTI according to the allowed TBS and power in the WTRU. A condition may be that the UL logical channel or logical channel type belongs to a list of logical channels that may be mapped and/or that may be allowed to fallback to PRACH. For example, the WTRU may be allowed to fallback and/or transmit UL information from the list of logical channels over the R99 RACH. The WTRU may be allowed to fallback and/or transmit UL information for certain logical channels from the list of logical channels over the R99 RACH. The list of which logical channels may be allowed to be transmitted over R99 RACH may be configured, for example, by the network via RRC signaling and/or predefined in the WTRU. For example, a predefined set of logical channels may be configured in the WTRU and/or the network may configure the WTRU with which logical channel type(s) the WTRU may fallback to R99 RACH. Such logical channels may be of the signaling type that may comprise higher priority data and/or lower payloads than data traffic channels. An example of such a channel type may be CCCH logical channel type. When configured and/or predefined with CCCH, the WTRU may determine it may fallback to R99 PRACH if the UL data to transmit is of CCCH type. An example of such a channel type may be DCCH. For example, if the network redirects the WTRU to fallback to R99 RACH (e.g., the E-AI value and/or the E-DCH resource index correspond to the fallback stored in the WTRU), the WTRU may check if the UL data transmission comprises data from the predefined and/or configured list (e.g., if the data is from CCCH logical channel types or DCCH), and then the WTRU may fallback for transmission to R99 RACH. If the logical channel for UL transmission is not one that is allowed by the configured logical channel types (e.g., DTCH), then the WTRU may not perform RACH fallback. A condition may be that a dedicated E-RNTI may or may not be configured for that WTRU. Other conditions may also trigger the fallback use of R99 RACH.

A dedicated RRC signal and/or message may be used to configure the WTRU to use R99 RACH for UL transmission. For example, the message may correspond to a RRC message configuring the WTRU to use R99 RACH. The configuration may be performed using, for example, a Cell Update Confirm message, a RRC reconfiguration message, and/or a System information message. For example, an Information Element (IE) may be broadcasted indicating to WTRUs capable of fallback to R99 RACH to use R99 RACH for UL transmission. The indication to fallback to R99 RACH may include additional criteria that may be used by a WTRU to determine if it should fallback to R99 RACH. For example, the fallback to R99 RACH may apply to a group of WTRUs for which a particular identifier and/or WRTU identity (e.g., E-RNTI) lies within a predefined and/or signaled range of values. Fallback to R99 RACH may apply for certain types of traffic (e.g., CCCH) and/or to WTRUs operating in certain states (e.g., IDLE mode and URA_PCH).

The RRC signaling may indicate the time duration for which a fallback to R99 RACH may be performed after the reception of that message. For example, a timer may be reset upon receipt of the message. Once the timer expires, the WTRU may start using common E-DCH again. An explicit message may be used to explicitly indicate to the WTRU to stop performing fallback to R99 RACH. The time duration for which a fallback to R99 RACH may be performed may be signaled using system information.

A Radio Link Protocol (RLC) configuration may be used when determining to fallback to R99 RACH. For example, a R99 RACH may not be used with flexible RLC PDU configuration, as the transport block supported by RACH may be fixed and/or the MAC used for R99 access may not have segmentation capabilities. The RLC PDU configuration may be taken into account when determining the fallback decision/triggers. The WTRU may use R99 RACH if one or more criteria related to the RLC may be satisfied, e.g., as described herein. The criteria may be that the logical channel which has UL data to transmit may be configured with fixed RLC PDU. The criteria may be whether the logical channel may be configured with TM or UM RLC. The criteria may be whether the RLC PDUs already created in the RLC entity may fit in the allowed TB sizes of the R99 RACH. The criteria may be that there may be no RLC PDUs in the retransmission buffer. The criteria may be that there may be no RLC PDUs already created in the RLC entity (e.g., there are not RLC PDUs already pre-generated but not yet transmitted, and/or there are not RLC PDUs to be retransmitted). For example, if RLC PDUs are already created, the size of the RLC PDUs on the logical channel may correspond to an allowed RLC PDU size, as broadcasted in the system information and/or provided to the WTRU via an RRC message. If there are RLC PDUs already created, the RLC PDUs may be smaller than or equal to the allowed RLC PDU size that may be broadcasted as part of the RACH system information. For example, the RLC PDUs that are smaller may be any size or a size that is a function of the allowed size (e.g. a fraction).

The criteria described herein may be used by the WTRU to determine one or more of the following. The criteria described herein may be used by the WTRU to determine whether to autonomously fallback. The criteria may be used by the WTRU to determine whether to fallback after a network indication (e.g., if the network indicates fallback and the criteria is not met, the WTRU may ignore the network indication). The criteria described herein may be used by the WTRU to determine whether it is permitted to fallback and perform a R99 RACH selection. The criteria described herein may be used by the WTRU to determine whether to use R99 RACH. The criteria described herein may be used by the WTRU to determine the above and indicate to the network that the criteria may be met (e.g., the WTRU may fallback to R99 RACH).

For example, the network may determine channel control. As referred to hereafter, a channel or resource selection in a non-DCH state may include one or more of the following channel selections: R99 RACH, Common E-DCH, Common E-DCH with 2 ms TTI, or Common E-DCH with 10 ms TTI.

A channel or resource selection may also be used interchangeably with TTI selection and/or transport channel selection. For example, TTI selection may correspond to a selection of a common E-DCH with 2 ms or 10 ms TTI. Transport channel selection may correspond to a selection between RACH and common E-DCH. Implementations may be described herein where the network may dynamically control the TTI and/or transport channel selection.

The WTRU may perform an initial TTI and/or transport channel selection and may indicate a TTI and/or transport channel selection preference to the network. The network may dynamically control the TTI and/or transport channel selection.

The WTRU may perform a preamble transmission based on, for example, a common E-DCH and/or WTRU capability. The network may dynamically control the UL resources that the WTRU may use for UL transmission.

The WTRU may perform an initial TTI and/or transport channel selection based on a number of criteria and preferred resource access. For example, upon selecting a TTI and/or transport channel, the WTRU may initiate an UL RACH procedure by selecting a preamble from a group of preambles that correspond to the selection of the WTRU.

For example, the WTRU may determine to use, that it is allowed to use, and/or that it may prefer to use a R99 RACH resource if one or more of the following conditions are satisfied/established. The conditions may include, but are not limited to, one or more of the following: the WTRU is be capable of fallback to R99 RACH; the network is capable of R99 RACH fallback; the buffer size of the WTRU is below a threshold; the WTRU is transmitting data corresponding to a logical channel that is in a list of allowed/configured logical channels for which R99 RACH may be allowed (e.g., CCCH); a common E-DCH access has failed; or any of the conditions related to a fallback to R99 RACH are satisfied. For example, the WTRU may determine that there are no already created RLC PDUs in the RLC entity. For example, the WTRU may determine that there are no RLC PDUs already created in the RLC entity (e.g., in the retransmission buffer or in the RLC created but not yet transmitted) that may correspond to a size different than the allowed broadcasted RLC PDU size.

The WTRU may perform TTI selection (e.g., select a preamble from a set of 2 ms TTI resources or 10 ms TTI resources) if one or more of the following conditions are met. The conditions may include, but are not limited to, one or more of the following: the WTRU is capable of concurrent 2 ms and 10 ms TTI operation (e.g., the WTRU may choose between 2 ms and 10 ms TTI for UL common E-DCH access); the network is capable of concurrent 2 ms and 10 ms TTI operation; the WTRU is transmitting data corresponding to a logical channel that is in a list of allowed/configured logical channels for which concurrent 2 ms and 10 ms TTI operation may be allowed; the WTRU may determine to use 2 ms or 10 ms TTI resources based on select conditions (such as, but not limited to WTRU power headroom); the buffer size in the WTRU may also be used to select the TTI; or the buffer size may be used in addition to, for example, the power margin and/or WTRU headroom criteria (e.g., if the power margin may be above a threshold and/or the buffer occupancy may be above a threshold, the WTRU may select the 2 ms TTI; and if the buffer may be below a threshold, the WTRU may select the 10 ms TTI).

Based on TTI selection and/or the transport channel selection, the WTRU may determine the preamble to use for UL preamble transmission.

If the WTRU determines to fallback (e.g., select R99 RACH), the WTRU may autonomously fallback to R99 RACH resources (e.g., PRACH system information) and may perform the R99 procedure to determine the preamble from the set of allowed preambles for R99 RACH (e.g., the legacy R99 RACH).

For example, if the WTRU determines to select and/or determine that it is allowed to use RACH to transmit data, it may chose a preamble from a set of preamble reserved to distinguish WTRUs that may use and/or that may prefer to use R99 RACH over common E-DCH.

Preamble groups may be reserved and may be used by WTRUs that may select a different TTI for common E-DCH. For example, a group of preambles may be reserved for WTRUs that prefer to use a TTI different than the TTI used for the common E-DCH resources (e.g., legacy common E-DCH resources). For example, two groups of preambles may be reserved for 2 ms and 10 ms TTIs respectively for WTRUs that may select the TTI.

At least a set of preamble resources may be reserved and/or may be broadcasted/signaled for WTRUs that can make use of transmission on either R99 RACH or common E-DCH and/or for WTRUs that can perform TTI selection on common E-DCH. A set of preamble resources may correspond to one or more of the following parameters: a set of preamble signatures; a separate scrambling code; or a set of reserved access slots.

For transport channel selection, preamble resources may be reserved to be used by WTRUs that may be allowed to and/or prefer to perform R99 RACH transmission, e.g., according to any of the selection criteria discussed herein, which may be referred to as "R99 fallback PRACH resources." If the selection criteria as described herein is met and/or the WTRU determines that it is allowed to and/or prefers to use R99 RACH, then the WTRU may select a preamble signature and/or a scrambling code from the R99 fallback PRACH resources and/or may initiate preamble transmission. For example, the scrambling code may be specific to R99 fallback resources and/or it may be common to the common E-DCH resources. The selection, for example as described herein, may be carried out at the beginning of the PRACH procedure and/or at a preamble retransmission.

For TTI selection, a preamble resource may be reserved according to one or more of the following. Preamble resources (e.g., one or more new preamble resources may be configured) may be reserved for one or more WTRUs that may support 2 ms and 10 ms TTI selection. Preamble resources for 2 ms and/or 10 ms TTI selection may be signaled. For example, preamble resources (e.g., new preamble resources) may be reserved/signaled for WTRUs that support a TTI other than the TTI signaled for the common E-DCH WTRUs (e.g., legacy common E-DCH WTRUs). For example, if the common E-DCH resources (e.g., legacy common E-DCH resources) have a TTI configuration of 10 ms, preamble resources (e.g., new preamble resources) may be reserved for WTRUs that select 2 ms TTI according to the criteria above.

A set of preamble resources may correspond to one or more of: a set of preamble signatures; a separate scrambling code; or a set of reserved access slots. Preamble resources may be reserved according to one or more of the following. One scrambling code may be used for R99 fallback capable WRTUs and one scrambling code for common E-DCH WRTUs. The preamble signatures within the scrambling code used for common E-DCH may be divided between common E-DCH WRTUs (e.g., legacy common E-DCH WRTUs) and concurrent 2 ms/10 ms TTI WRTUs, where preamble signatures may be reserved for 2 ms TTI access and 10 ms TTI access. For example, one scrambling code may be used for concurrent 2 ms/10 ms TTI capable WRTUs and a another scrambling code may be used for the fallback R99 capable WRTUs. For example, one scrambling code may be used for concurrent 2 ms/10 ms TTI capable WRTUs and fallback R99 WRTUs. The preamble signatures within this scrambling code may be divided according to one or more of the following. Preamble signatures may be divided between 2 ms and 10 ms common E-DCH access. The set of preamble resources may be signaled for 2 ms and a another set may be signaled for the 10 ms common E-DCH, for example, in addition to the legacy common E-DCH preamble resource set. For example, if the WRTU uses any of these signatures and/or scrambling code, it may mean that the WRTU is R99 fallback capable. Preamble signatures may not be divided further for R99 RACH fallback capable WRTUs. For example, preamble signatures may be divided between 2 ms and 10 ms common E-DCH access and R99 RACH fallback capable WRTUs. For example, a WRTU may choose to use a preamble signature from the R99 RACH fallback set of resources if the conditions described below are met.

A WTRU may determine which set of reserved preambles to use for initial preamble access according to different criteria and/or preferred channel access. For example, the WRTU may determine to select a preamble from a R99 RACH fallback set of resources if one or more of conditions are met. The conditions may include one or more of the following: that the WTRU is fallback to R99 RACH capable; that a common E-DCH access has failed; that the buffer size of the WTRU is below a threshold; that the WTRU is transmitting data corresponding to a logical channel that is in a list of allowed/configured logical channels for which R99 RACH may be allowed (e.g., CCCH and/or DCCH); or any of the conditions described herein for a fallback to R99 RACH are met.

Based on the UL resource selection (e.g., R99 RACH or 2 ms and/or 10 ms common E-DCH), the WTRU may determine which PRACH resources to use for preamble transmission.

A WRTU may determine whether to select a preamble from a set of concurrent 2 ms and 10 ms TTI resources if one or more of the following conditions are met: the WRTU is capable of concurrent 2 ms and 10 ms TTI operation (e.g., it may chose between 2 ms and 10 ms TTI for UL common E-DCH access); the WRTU is transmitting data corresponding to a logical channel that is in a list of allowed/configured logical channels for which R99 RACH is possible (e.g., CCCH); or the WRTU determines within the 2 ms and 10 ms TTI set, the group from which resources are chosen.

A WTRU may determine to transmit and/or that it prefers to transmit on R99 RACH. The WTRU may select a preamble from the R99 RACH fallback PRACH resources. If the WTRU determines that it prefers to use common E-DCH, the WTRU may determine the TTI to use based on the TTI selection criteria described above. The WTRU may select a preamble from the PRACH resources corresponding to a chosen TTI value from the reserved group of preambles.

If PRACH resources are broadcasted for a TTI configuration different than the common E-DCH (e.g., legacy common E-DCH), then the WTRU may chose a preamble from that set of PRACH resources, for example, if the WTRU selects a different TTI than the common E-DCH (e.g., legacy common E-DCH). Otherwise, the WTRU may select a preamble from the PRACH resources signaled for the common E-DCH resources (e.g., legacy common E-DCH resources).

This may allow the network to determine that WTRUs making such access may be UL channel selection capable, such as but not limited to fallback to R99 RACH capable and/or concurrent 2 ms/10 ms TTI capable and/or have potentially met the criteria above and/or expressed a choice of UL channel. The network may use this information to determine what resources to allocate to the WTRU (e.g., RACH or Common E-DCH, and, within common E-DCH it may determine whether to use 2 ms TTI or 10 ms TTI).

The WTRU may use one or more of the UL channel resources in a flexible way controlled by the network. For example, a set of preamble resources may be reserved for a group of WTRUs that may make use of transmission on R99 RACH and/or common E-DCH.

Using the pool of selected preamble resources, for example, the WTRU may start performing the preamble ramp-up phase according to procedures (e.g., legacy procedures) and may wait for an explicit indication to determine which set of resources to use. Even though the preamble resources may be split and/or grouped for different UL accesses, the physical resources used for UL access (e.g., the PRACH and/or the Common E-DCH resources) may be split from resources (e.g., legacy resources), or, the same resources may be used. For example, a default association between the preamble group and UL resources may be defined.

The determination of which resources to use for UL access may be based on a set of rules and/or on explicit signaling by the network. The decision making process in the WTRU may be according to one or more of the following. A reserved preamble group may have a default associated set of UL resources. If the WRTU chooses the preamble from the dedicated R99 fallback RACH preamble set, the default set of resources associated with this preamble set may be a set of R99 RACH resources. The R99 RACH resources may be associated to a set of PRACH resources (e.g., legacy PRACH resources) (e.g., the first PRACH configuration if more than one is available), or a set of specific R99 fallback PRACH info may be defined and used. For example, the preamble group associated with a 2 ms TTI or a 10 ms TTI common E-DCH may have as a default set a set of the common E-DCH resource set configured with 2 ms or 10 ms respectively. The 2 ms preamble set and 10 ms preamble set may have as a default set the same common pool of E-DCH resources. The common E-DCH resources may be used with any TTI value. This common E-DCH resource set may correspond to the legacy set of Common E-DCH resources and/or to a set of common E-DCH resources (e.g., new set of common E-DCH resources). If the legacy common E-DCH resource is chosen, the default set may be the common E-DCH configuration (e.g., legacy common E-DCH configuration). If the WTRU selects the common E-DCH set, then the network may not redirect the WTRU to another UL resource, for example, because it may not be aware that the WTRU supports such UL resource selection.

An AICH may be used to acknowledge the use of a default set of resources and the E-AI may be used to explicitly redirect the WRTU to a different set of resources. After choosing a preamble from a preamble group, the WRTU may transmit the preamble and may monitor the AICH. If an ACK on the AICH is received, this may be interpreted as an acknowledgment that the defined default set of resources associated to the selected preamble may be used. If a preamble from R99 fallback PRACH resources is chosen and/or an ACK was received on the AICH and/or the default resources are the R99 RACH resources, then the WTRU may initiate the R99 RACH message part transmission using the default physical set of resources signaled/broadcasted on the SIB. The scrambling code and/or signature sequences of the selected preamble may be used to determine the channelization code and/or perform UL transmission. For example, if a 2 ms TTI preamble is transmitted and an ACK is received, the WTRU may initiate common E-DCH transmission using the 2 ms TTI configuration and use the common E-DCH resource corresponding to the resource.

A NACK on the AICH may indicate a failure to access the default associated resources (e.g., if the default chosen may be a resource other than the legacy common E-DCH). The WTRU, after a failure to access the default resource, may retry again after a back off timer. The WTRU may use a preamble chosen from a different group of resources, or, from the same set of resources. For example, if initial access was with R99 fallback RACH and a NACK was received, the WTRU may retry again after a back-off time expires using the common E-DCH. The WTRU may attempt on the other non-default resources if failure to the default resources was detected for N attempts, where N may be network configurable and/or may correspond to the maximum number of preamble transmissions. This may be applicable if no Extended Acquisition Indicator (EAI) is configured. This mechanism may be applicable for some WTRUs and for some specific default resources (e.g., for R99 RACH). This mechanism may be applied to the scenario where a NACK is received on the EAI. This may be applied by the WTRU if a NACK may be received on the EAI, and/or if a NACK may be received for N attempts. For example, an EAI may be a value that corresponds to a combination of a signaled signature and modulation signal.

The reception of a NACK may signal to the WTRU that it may start monitoring the EAI for, for example, an explicit resource indication on the other non-default resource set and/or an index to a set of resources signaled on the default set. An index signaled over the EAI may correspond to an index to a non-default set. A non-default set may correspond to another UL channel and/or another TTI value. If the R99 RACH is the default set, then the non-default set may correspond to a common E-DCH set (e.g., the legacy common E-DCH set with one TTI configuration or a common E-DCH set which may have any TTI configuration). An assumption may be made that a R99 fallback compatible WTRU also supports TTI selection. The E-AI may signal an index which may be used in conjunction with the selected R99 fallback preamble to determine which common E-DCH index to use.

If the default set is a 2 ms TTI set, then the EAI may correspond to an index for the 10 ms TTI set. If the default set is a common E-DCH set, then an EAI may be used to signal a fallback to R99 RACH. This may indicate a preamble index to use for UL access and/or a PRACH index. The EAI may be used to signal what UL channel to use according to any of the methods described herein.

The reception of a NACK may trigger the WTRU to start monitoring the EAI. The EAI may indicate what resource the WRTU may use. For example, one or more EAI values may be used to indicate one UL resource. The remaining EAI values may be used to indicate another UL resource. For example, for transport channel selection, at least one or a subset of UL resources may be used to indicate the use of R99 PRACH (e.g., an index to a signature sequence, s) and the remaining subset may be used to indicate a common E-DCH index. For example, at least one value of the EAI may be used and/or reserved to indicate that the WRTU should perform a R99 RACH fallback and/or perform a R99 RACH access using signaled PRACH information. A reserved EAI value may be used by WRTUs that perform access using a preamble from one of the group of preambles that indicate support of R99 RACH access (e.g., either the R99 fallback preambles and/or the concurrent 2 ms/10 ms TTI preambles, for example, under the assumption that such WTRUs support R99 fallback). The EAI value corresponding to a fallback may be a predefined value (e.g., the same value as used for NACK over the EAI or any new value). The reserved value may be configured and/or signaled to the WTRU. A value in the list of common E-DCH resources (e.g., a common E-DCH resource index) may be reserved for R99 RACH fallback indication. The reserved value may be configured via RRC signaling and/or predefined. The WTRU may receive which index and/or value that may correspond to a R99 fallback as part of the R99 fallback configuration information and/or the values may be predefined. For example, if the received EAI value (e.g., signature and/or modulation symbol) is equal to the configured and/or stored R99 fallback value, then the WTRU may determine that it may fallback to R99 RACH transmission, for example, if the criteria described herein are met. For example, if the received and/or calculated E-DCH resource index is equal to the configured and/or stored R99 fallback index, then the WTRU may perform R99 RACH transmission, for example, if the other criteria described herein are met.

A subset of the EAI values (e.g., k) may be used to indicate an index to a set of 2 ms common E-DCH resources. Another subset of EAI values (e.g., l) may be used to indicate an index to a set of 10 ms TTI resources. For example, if 16 common E-DCH resources are used for 10 ms TTI and 16 for 2 ms TTI, the WRTU may determine to use a 10 ms common E-DCH resource if the indicated value received over the E-AI would correspond to a resource from 0-15 (e.g., 0 to k−1) and a 2 ms resource if the index corresponds to a value of 16-31 (e.g., k to l+k−1). This may be achieved if the 2 ms and 10 ms TTI resources are maintained as one list, if the first x resources correspond to the 2 ms TTI configuration, and the remaining resources correspond to a 10 ms TTI configuration. The EAI may be used to signal a value that may be then used to determine an index to the common E-DCH list. Based on the common E-DCH index, the WRTU may determine if the associated resource has a 2 ms or a 10 ms TTI configuration. If the index, for example, corresponds to a value between 0 and x−1, then the resource may be a 2 ms TTI resource, otherwise it may be a 10 ms TTI resource.

The EAI may be used to signal any of the UL channels and/or resources. The index determined after reception of the EAI may correspond to a R99 PRACH, 2 ms TTI, or 10 ms TTI. A list of values may be reserved on the EAI to signal a R99 PRACH, a 2 ms TTI, and/or a 10 ms TTI. For example, one or more indexes may refer to 2 ms TTI (0 . . . x−1), one or more indexes may refer to 10 ms TTI (x . . . x+y−1), and one or more indexes may be used to indicate a fallback to a R99 PRACH for UL access, where x may be the list of configured 2 ms TTI resources, y may be the list of configured 10 ms common E-DCH resources, and the sum of the resources do not exceed a certain maximum number (e.g., 32).

For example, if the common E-DCH resources between the 2 ms TTI and the 10 ms TTI configuration are split, then the default common E-DCH index, X, for a TTI configuration may correspond to X=SigInd mod (N), where N may be the maximum number of common E-DCH resources configured with the corresponding selected TTI. The default common E-DCH index X may be determined based on a WTRU's initial TTI selection (e.g., N may correspond to the maximum number of common E-DCH resources with the selected TTI).

The default X value may be dependent on whether an ACK on the AICH is received or whether an EAI is received. If an ACK is received, the value X and the common E-DCH index to use may be determined as described herein. If an EAI is received and the full EAI range of values is used to signal any index to a common E-DCH list that includes both 2 ms TTI and 10 ms TTI, then the value X may be determined by X=SigInd mod (N), where N may be the maximum common E-DCH resources for TTI configurations. If the E-AI values are split to signal different TTI configurations, then N may correspond to the maximum common E-DCH resources with a TTI configuration corresponding to the TTI associated to the EAI value.

SigInd may be the Nth PRACH preamble signature corresponding to the AI that is configured available in the cell and corresponding to E-DCH transmission for Enhanced Uplink in CELL_FACH state and IDLE mode for selected TTI configurations.

If an E-AI is used to signal an index to a common E-DCH resource, the WTRU may use the formula (X+EAI value) mod Y, where Y may be the total number of common E-DCH resources (e.g., regardless of the TTI configuration). The WTRU may use the formula (X+EAI value) mod N, where N may be the maximum number of common E-DCH resources with a corresponding TTI configuration. The corresponding TTI configuration may be determined based on a default mapping and/or based on the value of the EAI (e.g., that may be reserved as described herein).

Two or more E-AIs may be configured to indicate an UL channel to use. The WRTU may monitor for two or more E-AIs (e.g., simultaneously). Depending on which EAI the resource index is received, the WRTU may determine which UL channel to use.

A list of R99 RACH resources and/or common E-DCH resources may be signaled and/or associated to the preamble set. The AI may be used to acknowledge the use of a resource associated to the index of the preamble randomly selected (e.g., it may be either R99 RACH or common E-DCH). The EAI may be used to signal an index. Based on this index and/or the preamble selected, the WTRU may determine the index to the resource it may use.

A common E-DCH resource may be used with 2 ms TTI or 10 ms TTI configuration. The AI and/or the EAI may indicate to the WRTU which TTI it may use for the corresponding common E-DCH resource. The preamble group may be separated between the 2 ms TTI and 10 ms TTI, but the common E-DCH resource list may be one list and each resource may be used with any TTI configuration. The WRTU may determine what UL channel it wants to use (e.g., PRACH or common E-DCH). If the WTRU chooses a common E-DCH, the WTRU may determine what TTI configuration it wants to use. If the WTRU chooses a 2 ms TTI, then a preamble from the 2 ms TTI preamble group may be chosen. In order to determine whether it is allowed to use a 2 ms TTI or 10 ms TTI, one or more of the following techniques may be used. An ACK on the AICH may be used as an indication that the E-DCH resource associated with the chosen preamble and the TTI configuration corresponding to the preamble group that should be used. A NACK on the AICH may be used as an indication that the WRTU should not use the chosen TTI (e.g., the TTI associated with the preamble group). The WRTU may monitor the EAI to determine what resource it may use with the TTI (e.g., the new TTI). The NACK may be used as an indication that the WRTU may monitor the EAI. The WRTU may not have determined what TTI it may use.

The EAI may be used to indicate to the WRTU what TTI it should use. For example, the reserved field of the AICH may be used to indicate which TTI the WRTU should use. The response on the AICH (e.g., ACK/NACK) may be used in combination with the reserved field to determine what TTI to use. The reserved field may be used to indicate two values or just one value (e.g., two values may be used to indicate what TTI value to use, and one value may used to indicate whether the WRTU should change the chosen TTI value). If an ACK is received on the AICH, the WRTU may determine to the use the associated common E-DCH index with a TTI configuration as indicated in the reserved field of the EAI. If an NACK is received on the AICH, the WRTU may determine to monitor an EAI (if configured) for a resource indication. The TTI that the WRTU may use for the signaled resource over the EAI may be the TTI as indicated on the reserved field with the NACK.

The network may control channel selection (e.g., TTI or transport channel selection) for individual and/or groups of WTRUs. The network may control the fallback or use of R99 RACH for UL transmission. The WTRU may wait for an indication to fallback to R99 RACH. The network may control the common E-DCH channel type the WRTU should use, such as, but not limited to, a 10 ms or a 2 ms common E-DCH channel. After triggering a preamble transmission, the WTRU may wait for signaling to determine which UL channel to use, such as, but not limited to, to fallback or use R99 RACH, to use 2 ms TTI, and/or to use 10 ms TTI. For example, at least one value in the E-AI may be reserved and/or used to signal fallback to R99 RACH, fall back to another TTI value for Common E-DCH, and/or to signal what TTI the WRTU should use for common E-DCH. Upon reception of this value over the E-AI, the WTRU may autonomously fallback to R99 RACH, may autonomously fallback to using another TTI value (e.g., other than the requested one), or may start using the TTI value indicated by the reserved value of the AICH and/or the E-AI in the case of TTI selection. The reception of a NACK (e.g., on the E-AI if the E-AI is configured, or on the AI if no E-AI is configured) may also serve as signaling used to control the WRTU and indicate a fallback. At least one resource index and/or a set of resources in the list of common E-DCH may be reserved for a specific UL channel (e.g., used for fallback to R99 RACH or to use 2 ms TTI or 10 ms TTI). When a fallback to R99 RACH capable WRTU and/or a WRTU that may be capable of changing TTI values for common E-DCH receives this resource allocation over the E-AI, the WTRU may select the indicated channel for transmission (e.g., R99 RACH or a common E-DCH with the indicated TTI value). WTRUs (e.g., legacy WTRUs) may use the resource indicated by the index as a common E-DCH resource. For example, the reserved field of the AICH and/or the E-AICH may be used to indicate to the WTRU to fallback to R99 RACH and/or to select another TTI.

A secondary E-AICH code may be monitored by fallback to R99 RACH capable WRTUs and/or WRTUs capable of changing TTI values for common E-DCH. The secondary E-AICH may be configured by a network (e.g., by broadcast signaling and/or via dedicated signaling). The network may be fallback to R99 RACH capable and/or capable of changing the Common E-DCH TTI UL access. The secondary E-AI may be used to indicate a fallback to R99 RACH and/or a common E-DCH TTI. The secondary E-AI may be used to indicate a preamble resource from the R99 PRACH resources that the WTRU may use for its RACH access. The secondary E-AI may be further used to indicate a preamble and/or common E-DCH resource configured with a TTI and/or a common E-DCH resource index with a specific TTI.

In order for the WTRU to determine whether and when to monitor the secondary E-AI, one or more criteria may be used. The criteria may include, but are not limited to, that a UL channel selection capable WTRU (e.g., fallback to R99 RACH and/or common E-DCH with different TTIs) may monitor the primary and secondary E-AICH. The reserved field in the AICH may be used to indicate to the WTRU to monitor the secondary EAI. The reserved field of the AICH may be used to signal a value that may correspond to an indication that the WTRU should fallback to R99 RACH and/or that it should change TTIs. The reserved field of the AICH may be used to signal to the WTRU that it should monitor a EAI (e.g., a secondary E-AI) to potentially receive a resource assignment and/or any other signal. Detection of NACK signaled on the primary E-AI may be used as a criterion. Upon reception of a NACK on the E-AI and/or in the AI (e.g., if a primary EAI is not configured for legacy WTRUs), a UL channel selection capable WTRU may start to monitor a secondary EAI. The WTRU may start monitoring the EAI a certain time period after one of the conditions described herein are met.

The network may determine the capabilities of WTRUs by the use of one or more (e.g., a set of) reserved preamble groups for R99 RACH capable WTRUs (e.g., as determined by the criteria described herein). The network may use any of the implementations described herein to indicate to a WTRU whether to fallback to R99 RACH or to common E-DCH.

A WTRU may perform transport channel selection. The WTRU may indicate a preference for resources. The WTRU may determine if the WTRU and the network support transport channel selection and/or fallback to R99 RACH. The WTRU may determine if the criteria described herein are met. For example, the WTRU may determine if the buffer status is below or equal to a threshold. The WTRU may determine whether RLC PDUs are created and present in a retransmission buffer. If there are no RLC PDUs in the buffer, the WTRU may determine if RLC PDUs with a size different and/or greater than the allowed RLC PDU size for the RACH are present.

If the criteria are met, the WTRU may select a preamble from the R99 RACH fallback and may initiate a preamble ramp-up procedure. Based on the selected preamble, the network may determine the preference and/or type of WTRU performing uplink access and may determine the transport channel to use. If the WTRU fails to meet the criteria, the WTRU may select a preamble from the common E-DCH preambles (e.g., legacy common E-DCH preambles). In such instances, when the network receives the preamble, the network may not know that the WTRU is R99 RACH capable and, therefore, may not have the option to send the WTRU to R99 RACH.

The WTRU's default resources may be the common E-DCH resources. The WTRU may start using the common E-DCH resource associated with a default common E-DCH index, X, in response to receiving an ACK on the AICH. For example, X=SingInd mod Y, where SingInd may be the Nth preamble of the R99 fallback preamble list. The TTI configuration to use for the common E-DCH may be the TTI configuration of the common E-DCH resources (e.g., legacy common E-DCH resources) or, the common E-DCH may be provided to the WTRU using any of the examples described herein. The EAI may be used to signal the WTRU to fallback or use the R99 RACH by any of the implementations described herein, such as but not limited to: a NACK on the EAI; a reserved common E-DCH index; or a reserved value of EAI. The other EAI values may be used to redirect the WTRU to use a different common E-DCH resource index other than the default X. When no EAI is configured, a NACK on the AICH may signal such WTRUs to start using the R99 RACH.

The WTRU's default resources may be the R99 RACH resources. The WTRU may choose a preamble from the R99 fallback RACH preambles. An ACK on the AICH may imply that the WTRU has been acknowledged to fallback or to start using the R99 RACH. The NACK and/or EAI may be used to signal an index to a common E-DCH according to any of the implementations described herein.

A WTRU may perform transport channel selection and may use a set of reserved preambles to signal that it supports R99 RACH. For example, the preambles may be reserved for R99 and/or they may be the preambles used for TTI selection (e.g., the preambles for 2 ms and/or 10 ms TTI configuration) that imply that the WTRU also supports R99 fallback. The network may not be aware of the WTRU buffer and/or RLC status. The network may still redirect the WTRU to use the R99 RACH according to any of the implementations described herein. This may be applicable where the network is aware of the WTRU buffer and/or RLC status (e.g., that the criteria is not met), but the network still may have the option to redirect the WTRU to use R99 RACH. For example, if the criteria to fallback is dependent on the logical channel type, the WTRU may fallback (e.g., only fallback) if the uplink transmission belongs to the predefined list and/or configured allowed channels (e.g., CCCH and/or DCCH may be part of the channel list). If the WTRU is R99 fallback capable, after performing a random access procedure trying to acquire a common E-DCH resource, the WTRU may monitor the AICH and/or E-AI to determine if a NACK on the AICH may be received. If the EAI value and/or corresponding E-DCH resource index received is equivalent to the index corresponding to the fallback, and if there may be CCCH uplink data to transmit and CCCH fallback is allowed or if there may be DCCH uplink data to transmit and DCCH fallback is allowed, then the WTRU may perform R99 RACH fallback. If the conditions above are not met (e.g., if there is DTCH data to transmit), then the WTRU may not fallback to R99 RACH. Where the logical channel type allowed to fallback to R99 RACH is CCCH (e.g., only CCCH), then if the WTRU has DCCH or DTCH data for transmission, the WTRU may determine not to fallback to R99 RACH. Upon reception of an indication to start using R99 RACH, the WTRU may start using R99 RACH regardless of the buffer status and/or RLC status (e.g., the WTRU may re-create the RLC PDUs or may create other RLC PDUs, for example, in an attempt to transmit as much data as possible). The WTRU may start using R99 RACH and, if the RLC status and/or buffer status are not met, may use the RACH to transmit a TVM report. The WTRU may ignore the network indication to fallback to R99 RACH, back off, and may try to access the UL again. For example, the WTRU may ignore the indication from the network to fallback using a random access channel (e.g., R99 RACH, R99 PRACH, etc.), may wait for a time (e.g., back off for a predetermined amount of time), and then may re-attempt to access the network. When attempting the UL access, the WTRU may decide to choose a preamble from the common E-DCH resources (e.g., legacy common E-DCH resources), which may not allow the network to know that the WTRU may be R99 fallback capable. This may increase the chances of accessing the UL over the common E-DCH.

The WTRU may perform TTI selection based on one or more of the criteria described herein (e.g., capability and power/headroom). Preambles (e.g., new preambles) may be reserved to signal a TTI indication other than the TTI configuration signaled on the common E-DCH list (e.g., legacy common E-DCH list). If the WTRU selects a TTI configuration other than the TTI used for the common E-DCH (e.g., legacy common E-DCH), then the WTRU may chose a preamble from the signaled PRACH resourced (e.g., new signaled PRACH resourced) for the TTI configuration (e.g., the new TTI configuration). The network may determine a preference of the WTRU. The network may become aware that the WTRU is TTI selection capable. The network may use any of the implementations described herein to acknowledge the selection or redirect the WTRU to a different TTI. If the WTRU selects the same TTI as the TTI signaled on the common E-DCH resource (e.g., legacy common E-DCH resource), then the WTRU may pick a preamble from the common E-DCH PRACH resources (e.g., legacy common E-DCH PRACH resources). The network may not know that this WTRU is capable of TTI selection and may not redirect the WTRU to use any other TTI. The AICH may be used according to the rules (e.g., the legacy rules) to indicate the common E-DCH index of the resources (e.g., legacy resources).

Preambles (e.g., new preambles) may be signaled for 2 ms TTI and 10 ms TTI configurations (e.g., for WTRUs capable of TTI configuration). Based on the chosen TTI, the WTRU may select the preamble from either the 2 ms or the 10 ms group. The network may be aware of the preference and that the WTRU may be TTI selection capable. The network may use any of the implementations described herein to redirect the WTRU.

Allowing a fallback to R99 RACH may result in transmissions of data over a R99 PRACH from a logical channel configured with flexible RLC PDU configuration. For example, considering that R99 RACH may not have segmentation capabilities and may transmit a limited set of TBS, a flexible PDU RLC may coordinate the RLC PDU creation with the R99 RACH transport format selection.

The RLC configuration in non-DCH states may correspond to flexible RLC PDU sizes. In order to enable transmission over R99 RACH, the RLC may create "radio aware RLC PDUs," such that the RLC PDUs may be created to fit within a selected RACH TBS without MAC layer segmentation. For example, the WTRU may determine the RLC PDU size based on one or more of the following criteria. A criterion may be the selected TBS size. A criterion may be the minimum selected TBS size and/or available number of bits quantized to the lowest allowed TBS size that is equal to or smaller than selected TBS. A criterion may be the minimum selected TBS size, available number of bits, and/or available power quantized to the lowest allowed TBS size that is equal to or smaller than selected TBS.

If the WTRU performs delayed radio aware RLC PDU creation when configured with fallback to R99 RACH and attempting a common E-DCH access, then the WTRU may start creating RLC PDUs after the E-DCH resource has been allocated to the WTRU. This procedure may prevent the WTRU from prematurely generating RLC PDUs that it may not be able to transmit over the R99 RACH. For example, the size of the delayed RLC PDUs might be decided according to any combination of the following criteria. A criterion may be the number of bits that may be transmitted according to, for example, the default grant broadcasted. A criterion may be the minimum between number of bits that may be transmitted according to, for example, the default grant and/or an allowed TBS from the set of the R99 RACH transport formats. An allowed TBS may correspond to, for example, the smallest TBS and/or the largest TBS. A criterion may be the minimum allowed TBS, available data, and/or default grant quantized to an allowed TBS size that may be smaller than the default grant. The size of the delayed RLC PDUs may be decided based on a broadcasted RLC PDU size.

MAC segmentation may be allowed for transmission over R99 RACH. For example, the MAC-i/is sub-layer may segment RLC PDUs (or MAC-d PDUs) prior to delivery to the MAC-e sublayer for transmission over RACH. A MAC-i/is header may be included in the R99 RACH transmission in order to allow the Node B to reassemble the segments received across multiple R99 RACH transmissions.

Upon a redirection/acknowledgement to R99 RACH, the WTRU may perform one or more of the following. The WTRU may initiate a RACH preamble transmission procedure (e.g., a new RACH preamble transmission procedure) using the PRACH information of the R99 RACH resources (e.g., legacy R99 RACH resources). This procedure may be accelerated using any of the implementations described herein. The WTRU may initiate a PRACH message transmission upon reception of a redirection/acknowledgment to use R99 RACH (e.g., legacy R99 RACH). The timing to initiate the PRACH message transmission with respect to the AICH may be maintained. For example, the WTRU may use any combination of the following physical channel parameters to perform the PRACH message transmission: a scrambling code of the preamble selected from the R99 fallback PRACH resources; the signature sequence, s, of the preamble selected from the R99 fallback RACH resources and/or used to determine a channelization code; or the other physical channel parameters, transport channel formats, etc., that may be extracted from the PRACH information (e.g., legacy PRACH information) (for example, if more than one PRACH info is selected, then the resources of the first one or a predefined one may be used). PRACH information (e.g., new PRACH information) may be broadcasted to be used from such WTRUs.

After selection and/or redirection of the R99 RACH channel for transmission, the WTRU may attempt to access the R99 RACH and/or may perform UL transmission of data and/or control information. Upon completion of this procedure, wherein completion may refer to transmission of the data over the air interface or RACH failure, the WTRU may have data in its buffer. If the WTRU immediately performs access to common E-DCH again, the same congestion may still occur. After attempting E-DCH access, the WTRU may fail again and may perform another fallback to R99 RACH. This may result in access delays and/or ping-ponging between different RACH accesses.

The behavior of the WTRU after a fallback to R99 RACH may be controlled. For example, a timer (e.g., a prohibit timer, a back-off timer, etc.) may be utilized to prevent the WTRU from attempting access on the common E-DCH for a certain period of time. The timer may be started in one or more of triggers. A trigger may be that the WTRU determines that a fallback to R99 RACH has to be performed. A trigger may be that a R99 RACH procedure has been completed as a result of a fallback to R99 RACH. A trigger may be that UL data was transmitted over the air using the R99 RACH. If another UL access attempt has to be performed by the WTRU and the timer is still running, then the WTRU may perform a R99 access. If the timer is not running, the WTRU may access the common E-DCH and/or re-evaluate the criteria to choose which RACH resources to use. If the timer is running and the WTRU has data to transmit, then the WTRU may trigger a TVM report to the network, which may indicate the reason of the trigger.

The WTRU may fallback to R99 after a common E-DCH failure or direct network indication even if the criteria above are not met. A traffic volume measurement (TVM) report may be triggered upon fallback to R99 RACH. For example, a TVM may be triggered if the WTRU falls back to R99 and various conditions are satisfied. A condition may be, for example, that the buffer size is above a threshold. This threshold may be a fallback to R99 RACH specific threshold and/or may be smaller than the threshold to trigger a TVM report for a WTRU using common E-DCH. A condition may be, for example, that the logical channel with UL data belongs to a list of logical channels the WTRU may not be allowed to use R99 RACH, or to a list that may trigger a TVM report. For example, at least two events may be configured for TVM reporting in the WTRU. One may be used when the WTRU is using common E-DCH and one may be used when the WTRU has performed a fallback to R99 RACH.

Faster RACH access may be provided where the WTRU may switch from a Common E-DCH access attempt to a R99 RACH access attempt, and vice versa. These situations may include, without limitation, a WTRU falling back to R99 RACH after having attempted common E-DCH access; a WTRU falling back to R99 RACH after an explicit command from the network after having attempted to connect to a common E-DCH resource; and/or a WTRU performing access and potentially transmission on the R99 RACH and determining that more data remains in the buffer and then attempting access to a common E-DCH resource.

In order to speed up such accesses, the WTRU may speed up the preamble phase, for example, by using a preamble power that is a function of the last preamble power used on the previous resource (e.g., common E-DCH resource or R99 RACH resource). The preamble power may correspond to one or more of the following. The preamble power may be the same power as the last preamble transmitted on the other resources. The preamble power may be the power of the last preamble transmitted on the other resources plus a configured offset.

The WTRU may speed up the access to the other resource by, for example, receiving a dedicated resource indication by the network. The resource indication may include an index to a preamble signature of the set of resources the WTRU is being signaled to access. In the case where a specific signal may be used by the network to signal a fallback to R99 RACH, this signal may include an index to a preamble resource (e.g., a scrambling code and/or a signature sequence, s, or index to PRACH info, if multiple PRACH info are signaled, that should be used by the WTRU). The index may be transmitted to the WTRU by means of an EAI. The signal may indicate the resource index and/or the common E-DCH value to use. Implementations by which the WTRU may determine that the EAI may be used to signal a UL channel selection (e.g., R99 RACH or TTI value) may be described herein. For example, a secondary EAI may be used to signal an index to a R99 PRACH preamble index and/or a common E-DCH resource index from a group of resources corresponding to a TTI value and/or a preamble index corresponding to a TTI value other than the requested value. Upon reception of this index, the WTRU may start the UL transmission on the indicated channel (e.g., RACH or common E-DCH with the indicated TTI). This may be performed with or without an acknowledgment required. The WTRU may determine the power to use based on the last preamble transmission on the common E-DCH resource. The WTRU may start preamble transmission using the last used power on the other channel.

Figure 2:
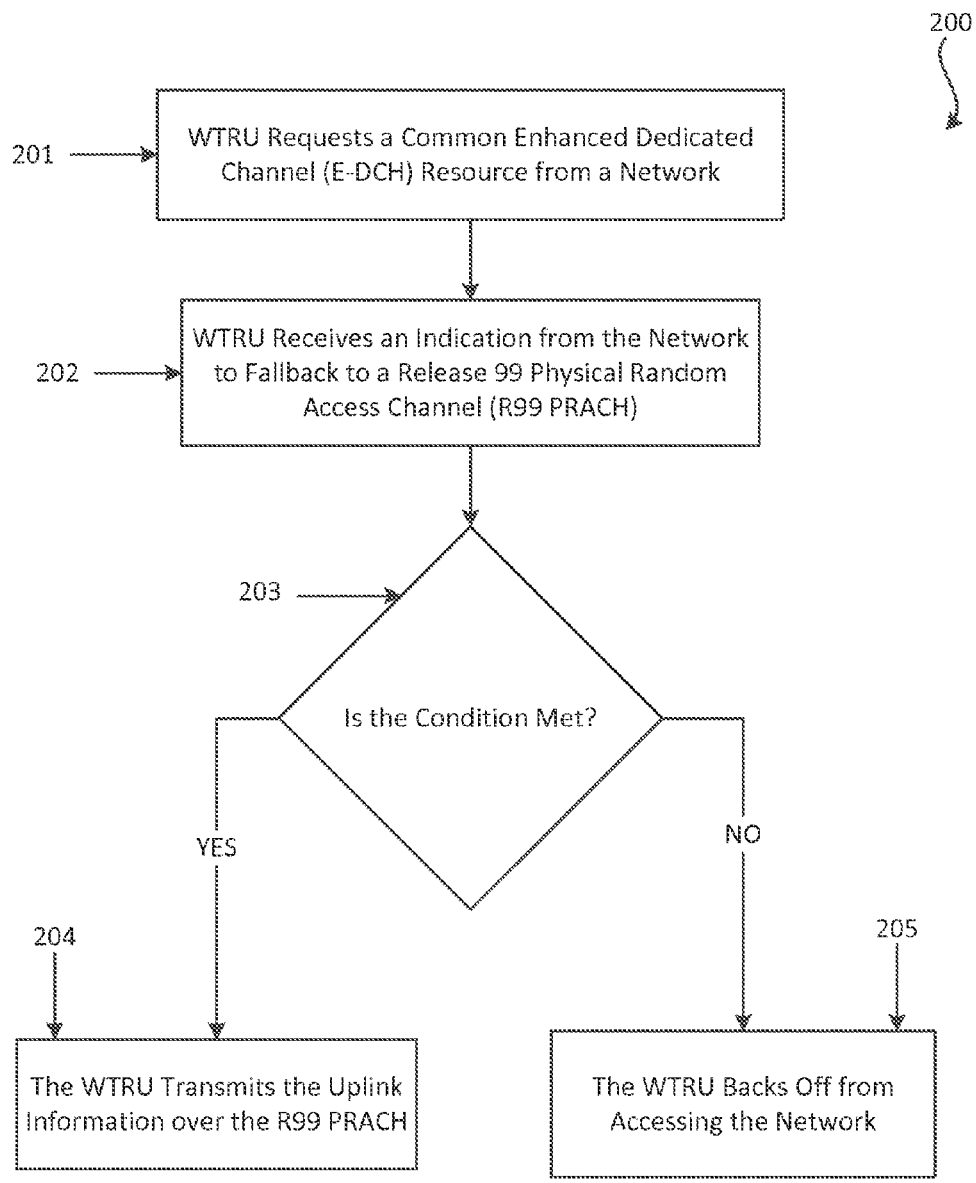
FIG. 2 illustrates an exemplary fallback.

FIG. 2 illustrates an exemplary fallback. The method 200 of FIG. 2 may be utilized by a WTRU to determine if it may fallback using a random access channel (e.g., R99 RACH, R99 PRACH, etc.) to transmit uplink information to a network. The WTRU may have uplink information such as, but not limited to, data or control information to transmit to a network. At step 201, a WTRU may request a common E-DCH resource from the network. For example, the WTRU's default resources may be the common E-DCH resources.

After requesting a common E-DCH resource from the network, the WTRU may receive an indicator from the network to fallback to a random access channel (e.g., R99 RACH, R99 PRACH, etc.), thereby completing step 202. The indication may be received via an acquisition indicator (e.g., E-AI). The indication may be a value of the E-AI. One or more E-AI values may be used to indicate the use of a random access channel (e.g., R99 RACH, R99 PRACH, etc.) and one or more E-AI values may be used to indicate a common E-DCH index. For example, at least one value of the E-AI may be used to indicate that the WTRU may perform a fallback to a random access channel (e.g., R99 RACH, R99 PRACH, etc.). The WTRU may receive the indication from the network to fallback regardless of whether or not the network is aware of the WTRU buffer and/or RLC status.

At step 203, the WTRU may determine if a condition is met. The condition may be met if one or more of the following is established: the channel for transmission is capable of being mapped to the R99 RACH; the channel for transmission may be configured with a fixed RLC PDU size; and/or the channel for transmission belongs to a list of channels that is predefined in the WTRU, whereby the list may include CCCH and/or DCCH. The condition may also be met if one or more of the conditions described herein are established.

If the WTRU determines that the condition is met, then the WTRU may fallback to the random access channel (e.g., R99 RACH, R99 PRACH, etc.) and may transmit the uplink information over the random access channel (e.g., R99 RACH, R99 PRACH, etc.), thereby completing step 204. For example, the WTRU may access the network with a PRACH R99 signature to transmit uplink information over the R99 RACH. The WTRU may initiate a RACH preamble transmission procedure using the PRACH information of the R99 RACH resource (e.g., legacy R99 RACH resources).

If the WTRU determines that the condition is not met, then the WTRU may back off from accessing the network, thereby completing step 205. The WTRU may determine that the condition is not met if one or more of the conditions described herein are not established. For example, the WTRU may determine that the condition is not met if the channel for transmission does not belong to the list of channels that is predefined in the WTRU. The WTRU may ignore the indication from the network to fallback to the random access channel (e.g., R99 RACH, R99 PRACH, etc.). The WTRU may wait for a time (e.g., a predetermine amount of time) and/or may re-attempt to access the network.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed is:

1. A method to transmit uplink information, the method comprising:
    requesting, by a wireless transmit/receive unit (WTRU), a common enhanced dedicated channel (E-DCH) resource from a network utilizing a preamble reserved for fallback to a Release 99 Physical Random Access Channel (R99 PRACH);
    receiving an indication from the network to fallback to R99 PRACH, wherein the indication is received via an acquisition indicator (E-AI);
    determining whether a condition is met, wherein the condition is met if the WTRU has data to transmit on a channel configured for fallback to R99 PRACH, and wherein the channel configured for fallback to R99 PRACH is a common control channel (CCCH) or a dedicated control channel (DCCH); and
    transmitting the uplink information over the R99 PRACH if the condition is met.

2. The method of claim 1, wherein the indication is a value of the E-AI.

3. The method of claim 1, wherein the uplink information is at least one of control information or data.

4. The method of claim 1, further comprising:
    receiving, from the network, an information element (IE) that configures the channel for fallback to R99 PRACH.

5. The method of claim 1, wherein the condition further comprises whether a Radio Link Control (RLC) size of the E-DCH is the same as a RLC size of the channel configured for fallback to R99 PRACH.

6. The method of claim 1, wherein the indication is an E-DCH resource index.

7. The method of claim 1, further comprising backing off from accessing the network when the condition is not met.

8. The method of claim 7, wherein backing off comprises:
    ignoring the indication from the network to fallback to the R99 PRACH;
    waiting for a time; and
    attempting to access the network.

9. A wireless transmit/receive unit (WTRU) configured to transmit uplink information, the WTRU comprising:
    a processor configured to:
        request a common enhanced dedicated channel (E-DCH) resource from a network utilizing a preamble reserved for fallback to a Release 99 Physical Random Access Channel (R99 PRACH); and
        determine whether a condition is met, wherein the condition is met if the WTRU has data to transmit on a channel configured for fallback to R99 PRACH, and wherein the channel configured for fallback to R99 PRACH is a common control channel (CCCH) or a dedicated control channel (DCCH); and
    a transceiver configured to:
        receive an indication from the network to fallback to R99 PRACH, wherein the indication is received via an acquisition indicator (E-AI); and
        transmit the uplink information over the R99 PRACH if the condition is met.

10. The WTRU of claim 9, wherein the indication is a value of the E-AI.

11. The WTRU of claim 9, wherein the uplink information is at least one of control information or data.

12. The WTRU of claim 9, wherein the processor is further configured to receive, from the network, an information element (IE) that configures the channel for fallback to R99 PRACH.

13. The WTRU of claim 9, wherein the condition further comprises whether a Radio Link Control (RLC) size of the E-DCH is the same as a RLC size of the channel configured for fallback to R99 PRACH.

14. The WTRU of claim 9, wherein the indication is an E-DCH resource index.

15. The WTRU of claim 9, wherein the processor is further configured to back off from accessing the network when the condition is not met.

16. The WTRU of claim 15, wherein backing off comprises:
the processor further configured to:
ignore the indication from the network to fallback to the R99 PRACH; and
wait for a time; and
the transceiver further configured to:
attempt to access the network.

* * * * *